United States Patent
Song et al.

(10) Patent No.: US 11,264,034 B2
(45) Date of Patent: Mar. 1, 2022

(54) VOICE IDENTIFICATION METHOD, DEVICE, APPARATUS, AND STORAGE MEDIUM

(71) Applicant: Baidu Online Network Technology (Beijing) Co., Ltd, Beijing (CN)

(72) Inventors: Ye Song, Beijing (CN); Long Zhang, Beijing (CN); Pengpeng Jie, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 94 days.

(21) Appl. No.: 16/801,742

(22) Filed: Feb. 26, 2020

(65) Prior Publication Data
US 2020/0286486 A1    Sep. 10, 2020

(30) Foreign Application Priority Data

Mar. 5, 2019  (CN) .......................... 201910163304.2

(51) Int. Cl.
*G10L 15/26*    (2006.01)
*G10L 15/05*    (2013.01)
(Continued)

(52) U.S. Cl.
CPC .............. *G10L 15/26* (2013.01); *G10L 15/02* (2013.01); *G10L 15/05* (2013.01); *G10L 15/06* (2013.01)

(58) Field of Classification Search
CPC ......... G10L 15/00; G10L 15/02; G10L 15/05; G10L 15/06; G06F 40/232
(Continued)

(56) References Cited

U.S. PATENT DOCUMENTS 7,103,542 B2 *  9/2006  Doyle .................... G10L 15/01
                                                          704/231
7,606,708 B2 * 10/2009  Hwang ................... G10L 15/06
                                                          704/257
(Continued)

FOREIGN PATENT DOCUMENTS

CN          1979638 A      6/2007
CN        105389400 A      9/2016
(Continued)

OTHER PUBLICATIONS

The State Intellectual Property Office of People's Republic of China, Second Office Action, for CN Application No. 201910163304. 2, dated Apr. 13, 2021 (13 pages).
(Continued)

*Primary Examiner* — Susan I McFadden
(74) *Attorney, Agent, or Firm* — Polsinelli PC; Gregory P. Durbin

(57) ABSTRACT

A voice identification method, device, apparatus, and a storage medium are provided. The method includes: receiving voice data; and performing a voice identification on the voice data, to obtain first text data associated with the voice data; determining common text data in a preset fixed data table, wherein a similarity between a pronunciation of the determined common text data and a pronunciation of the first text data meets a preset condition, wherein the determined common text data is a voice identification result with an occurrence number larger than a first preset threshold; and replacing the first text data with the determined common text data.

13 Claims, 5 Drawing Sheets

(51) Int. Cl.
*G10L 15/02* (2006.01)
*G10L 15/06* (2013.01)

(58) Field of Classification Search
USPC .............................................................. 704/9
See application file for complete search history.

(56) References Cited

U.S. PATENT DOCUMENTS

| | | | | |
|---|---|---|---|---|
| 7,668,710 | B2 * | 2/2010 | Doyle | G10L 15/01 |
| | | | | 704/9 |
| 9,484,031 | B2 * | 11/2016 | Bao | G06F 40/53 |
| 9,502,036 | B2 * | 11/2016 | Bao | G06F 40/232 |
| 9,524,714 | B2 * | 12/2016 | Choi | G10L 15/06 |

FOREIGN PATENT DOCUMENTS

| | | |
|---|---|---|
| CN | 106340293 A | 1/2017 |
| CN | 107015969 A | 8/2017 |
| CN | 107092606 A | 8/2017 |
| CN | 107993654 A | 5/2018 |
| CN | 107679033 A | 9/2018 |
| CN | 109065054 A | 12/2018 |
| JP | 2009210829 B | 9/2009 |
| JP | 4869268 B2 | 2/2012 |

OTHER PUBLICATIONS

The State Intellectual Property Office of People's Republic of China, Search Report, for CN Application No. 201910163304.2, dated Apr. 13, 2021 (13 pages).
Practical Fundamentals of Speech Recognition, ISBN 7-118-03746-X, 2004 (4 Pages).
Artificial Intelligence and its Application, 13th Five-Year Plan Teaching Material of Computer Universities, 203 pgs.
First Office Action dated Aug. 20, 2020, in CN201910163304.2, 11 pgs.
Search Report dated Aug. 10, 2020, in CN2019101633042, 6 pgs.

* cited by examiner

VOICE IDENTIFICATION METHOD, DEVICE, APPARATUS, AND STORAGE MEDIUM

CROSS-REFERENCE TO RELATED APPLICATION

This application claims priority to Chinese patent application No. 201910163304.2, filed on Mar. 5, 2019, which is hereby incorporated by reference in its entirety.

TECHNICAL FIELD

The present application relates to a field of voice identification technology, and in particular, to a voice identification method, device and apparatus, and a storage medium.

BACKGROUND

Voice identification technology is a technology used to identify a voice issued by a user. A voice identification has been widely used in various electronic products by using a commonly human-computer interaction technology. However, voice identification results are sometimes not ideal or accurate enough, resulting in poor user experience. Especially in a case where an offline voice identification is performed, more voice identification errors occur, due to poor computing power of a terminal device.

SUMMARY

A voice identification method and device are provided according to embodiments of the present application, so as to at least solve the above technical problems in the existing technology. In a first aspect, a voice identification method is provided according to an embodiment of the present application. The method includes: receiving voice data; and performing a voice identification on the voice data, to obtain first text data associated with the voice data; determining common text data in a preset fixed data table, wherein a similarity between a pronunciation of the determined common text data and a pronunciation of the first text data meets a preset condition, wherein the determined common text data is a voice identification result with an occurrence number larger than a first preset threshold; and replacing the first text data with the determined common text data.

In an implementation, the performing a voice identification on the voice data includes performing an offline voice identification on the voice data, wherein the common text data is obtained by an online voice identification and has the occurrence number larger than the first preset threshold.

In an implementation, the method further includes establishing the preset fixed data table by: performing an online voice identification on a pre-obtained voice data, to obtain second text data associated with the pre-obtained voice data; determining a semantic type of the second text data is offline processable; performing a word segment on the second text data, to obtain at least one word; and determine whether the obtained at least one word or the second text data is in a fixed data table; updating an occurrence number of the at least one word or of the second text data in a temporary data table, in a case where the obtained at least one word or the second text data is not included in the fixed datable; and recording a word or second text data having an occurrence number larger than a second preset threshold into the fixed data table, as a candidate common text data in the fixed data table.

In an implementation, the above method further includes releasing a storage space of the temporary data table in a Least Recently Used mode, in a case where a storage amount of the temporary data table reaches a storage upper limit.

In an implementation, semantics parsing result of the common text data is stored in the preset fixed data table; and after the determining common text data in a preset fixed data table, the method further includes extracting the parsed semantics of the at common text data from the preset fixed data table.

In an implementation, the determining common text data in a preset fixed data table includes: comparing the first text data with each candidate common text data in the preset fixed data table, by comparing phonemes at the same position of the first text data and the candidate common text data one by one to determine a same phoneme; and determining that the similarity between a pronunciation of the determined common text data and a pronunciation of the first text data meets the preset condition, in a case where a ratio of the number of same phonemes to the number of all phonemes is larger than a preset ratio threshold.

In a second aspect, a voice identification apparatus is provided according to an embodiment of the present application. The device includes: a preliminary identification module, configured to receive voice data; and perform a voice identification on the voice data, to obtain first text data associated with the voice data; a determination module, configured to determine common text data in a preset fixed data table, wherein a similarity between a pronunciation of the determined common text data and a pronunciation of the first text data meets a preset condition, wherein the determined common text data is a voice identification result with an occurrence number larger than a first preset threshold; and a replacement module, configured to replace the first text data with the determined common text data, in response to a determination of the common text data in the preset fixed data table.

In an implementation, the preliminary identification module is configured to perform an offline voice identification on the voice data; wherein the device further includes a database configuration module, configured to set the fixed data table, wherein the fixed data table includes one or more common text data, and the common text data is obtained by an online voice identification and has the occurrence number larger than the first preset threshold.

In an implementation, the database configuration module is configured to: perform an online voice identification on a pre-obtained voice data, to obtain second text data associated with the pre-obtained voice data; determine a semantic type of the second text data is offline processable; perform a word segment on the second text data, to obtain at least one word; and determine whether the obtained at least one word or the second text data is in a fixed data table; update an occurrence number of the at least one word or of the second text data in a temporary data table, in a case where the obtained at least one word or the second text data is not included in the fixed datable; and record a word or second text data having an occurrence number larger than a second preset threshold into the fixed data table, as a candidate common text data in the fixed data table.

In an implementation, the database configuration module is further configured to release a storage space of the temporary data table in a Least Recently Used mode, in a case where a storage amount of the temporary data table reaches a storage upper limit.

In an implementation, semantics parsing result of the common text data is stored in the preset fixed data table; and the replacement module is further configured to extract the parsed semantics of the at common text data from the preset fixed data table, in response to a determination of the common text data in the preset fixed data table.

In an implementation, the determination module is configured to: compare the first text data with each candidate common text data in the preset fixed data table, by comparing phonemes at the same position of the first text data and the candidate common text data one by one to determine a same phoneme; and determine that the similarity between a pronunciation of the determined common text data and a pronunciation of the first text data meets the preset condition, in a case where a ratio of the number of same phonemes to the number of all phonemes is larger than a preset ratio threshold.

In a third aspect, a voice identification apparatus is provided according to an embodiment of the present application. The functions of the device may be implemented by using hardware or by corresponding computer-executable instructions stored on a non-transitory computer-readable storage medium and executable by hardware. The hardware or instructions includes one or more modules corresponding to the functions described above.

In a possible embodiment, the device structurally includes a processor and a memory, wherein the memory is configured to store a program which supports the voice identification device in executing the above voice identification method. The processor is configured to execute the program stored in the memory. The device may further include a communication interface through which the device communicates with other devices or communication networks.

In a fourth aspect, a computer-readable storage medium for storing computer software instructions used for a voice identification device is provided. The computer readable storage medium may include programs involved in executing of the voice identification method described above.

One of the above technical solutions has the following advantages or beneficial effects: in the voice identification method and device, after a voice identification on the voice data is performed and first text data associated with the voice data is obtained, the first text data is replaced with a determined common text data, in a case where common text data in a preset fixed data table is determined, wherein a similarity between a pronunciation of the determined common text data and a pronunciation of the first text data meets a preset condition. In this way, a correction of a voice identification result may be realized, thereby improving voice identification accuracy.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

A voice identification method and device are provided according to embodiments of the present application. The technical solutions are described below in detail by means of the following embodiments.

Figure 1:
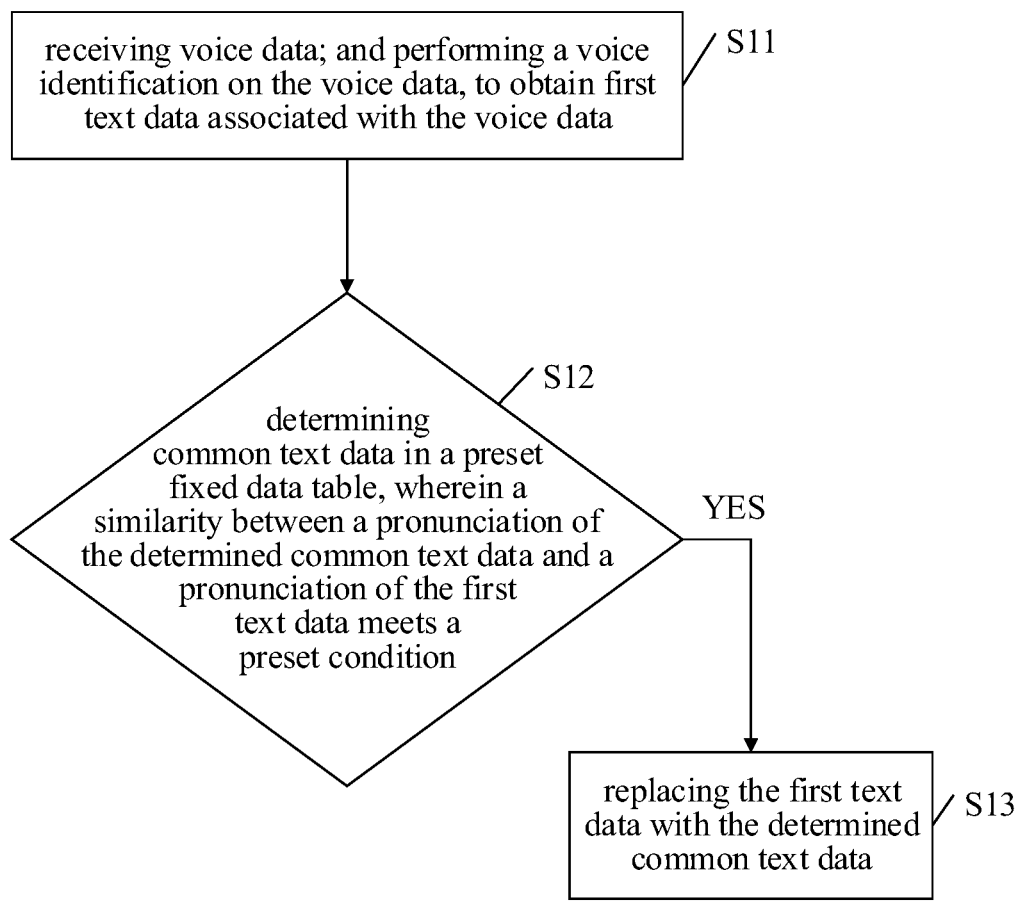
FIG. 1 is a flowchart showing an implementation of a voice identification method according to an embodiment of the present application.

FIG. 1 is a flowchart showing an implementation of a voice identification method according to an embodiment of the present application. The method includes: receiving voice data; and performing a voice identification on the voice data, to obtain first text data associated with the voice data at S11, determining common text data in a preset fixed data table, wherein a similarity between a pronunciation of the determined common text data and a pronunciation of the first text data meets a preset condition, wherein the determined common text data is a voice identification result with an occurrence number larger than a first preset threshold at S12, and replacing the first text data with the determined common text data at S13.

In a possible implementation, if multiple common text data in a preset fixed data table are determined, wherein a similarity between a pronunciation of the determined common text data and a pronunciation of the first text data meets a preset condition, the common text data with the highest similarity is selected. Then, the first text data may be replaced with the determined common text data.

The voice identification method according to an embodiment of the present application may be applied to an in-vehicle voice interaction apparatus. Since a driving area of a vehicle passes has an unstable network connection, it may not be capable to perform an online voice identification sometimes. Thus, in a possible implementation, an offline voice identification may be performed in the above method. Moreover, the common text data in the above described fixed data table may be determined according to a result of an online voice identification. Specifically, common text data in a fixed data table may be a voice identification result with an occurrence number larger than a first preset threshold.

Figure 2:
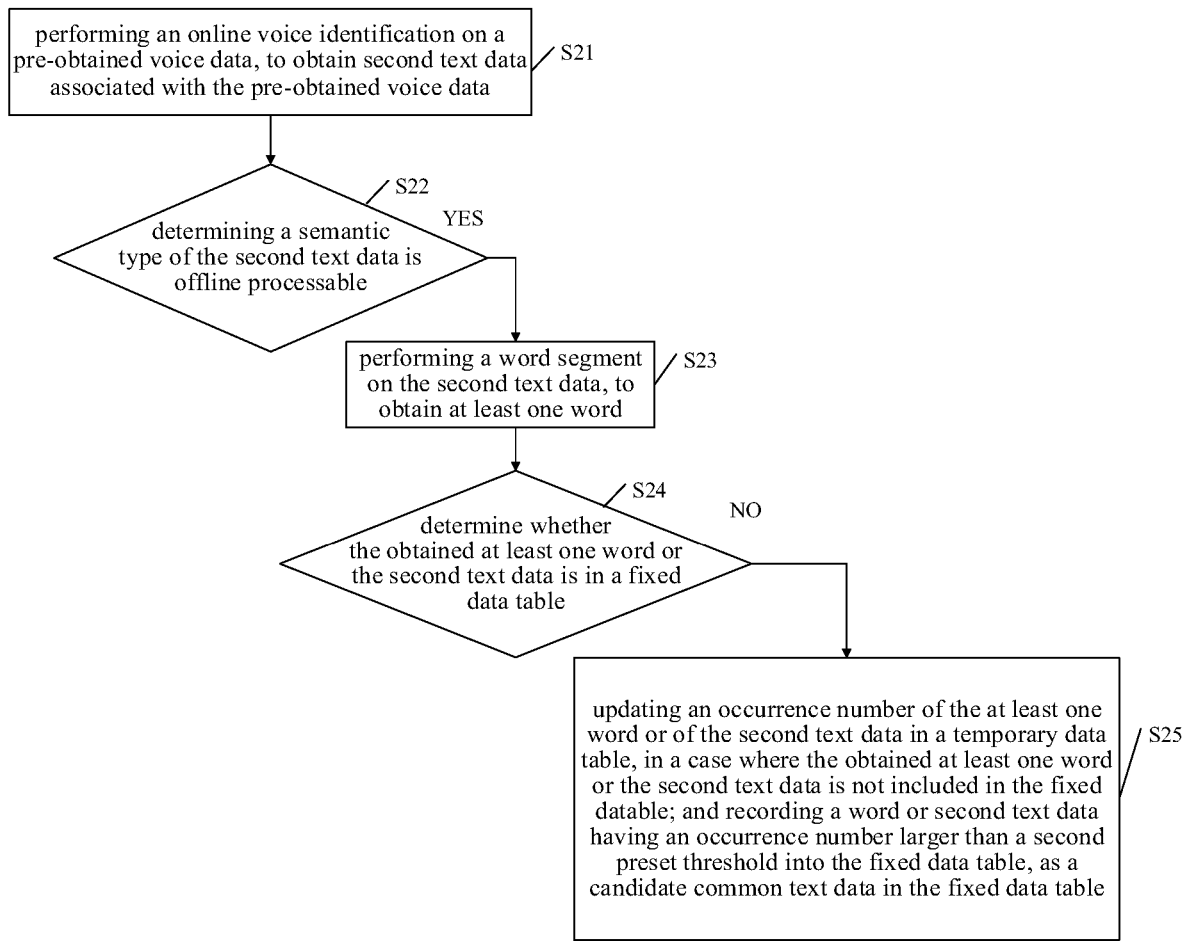
FIG. 2 is a flowchart showing an implementation of updating common text data in a fixed data table according to an embodiment of the present application.

FIG. 2 is a flowchart showing an implementation of updating common text data in a fixed data table according to an embodiment of the present application. As illustrated in FIG. 2, the method may further include: performing an online voice identification on a pre-obtained voice data, to obtain second text data associated with the pre-obtained voice data at S21; determining a semantic type of the second text data is offline processable at S22; performing a word segment on the second text data, to obtain at least one word at S23; determine whether the obtained at least one word or the second text data is in a fixed data table at S24; and updating an occurrence number of the at least one word or of the second text data in a temporary data table, in a case where the obtained at least one word or the second text data is not included in the fixed datable; and recording a word or second text data having an occurrence number larger than a second preset threshold into the fixed data table, as a candidate common text data in the fixed data table at S25.

When a word or second text data is recorded into the fixed data table, related data of the word or the second text data may be deleted from the temporary data table.

In a possible implementation, a storage space of the temporary data table may be released in a Least Recently Used mode, in a case that a storage amount of the temporary data table reaches a storage upper limit.

In a possible implementation, semantics parsing result of the common text data is stored in the preset fixed data table. Accordingly, after the determining common text data in a preset fixed data table at S12, the method may further include extracting the parsed semantics of the at common text data from the preset fixed data table.

Figure 3:
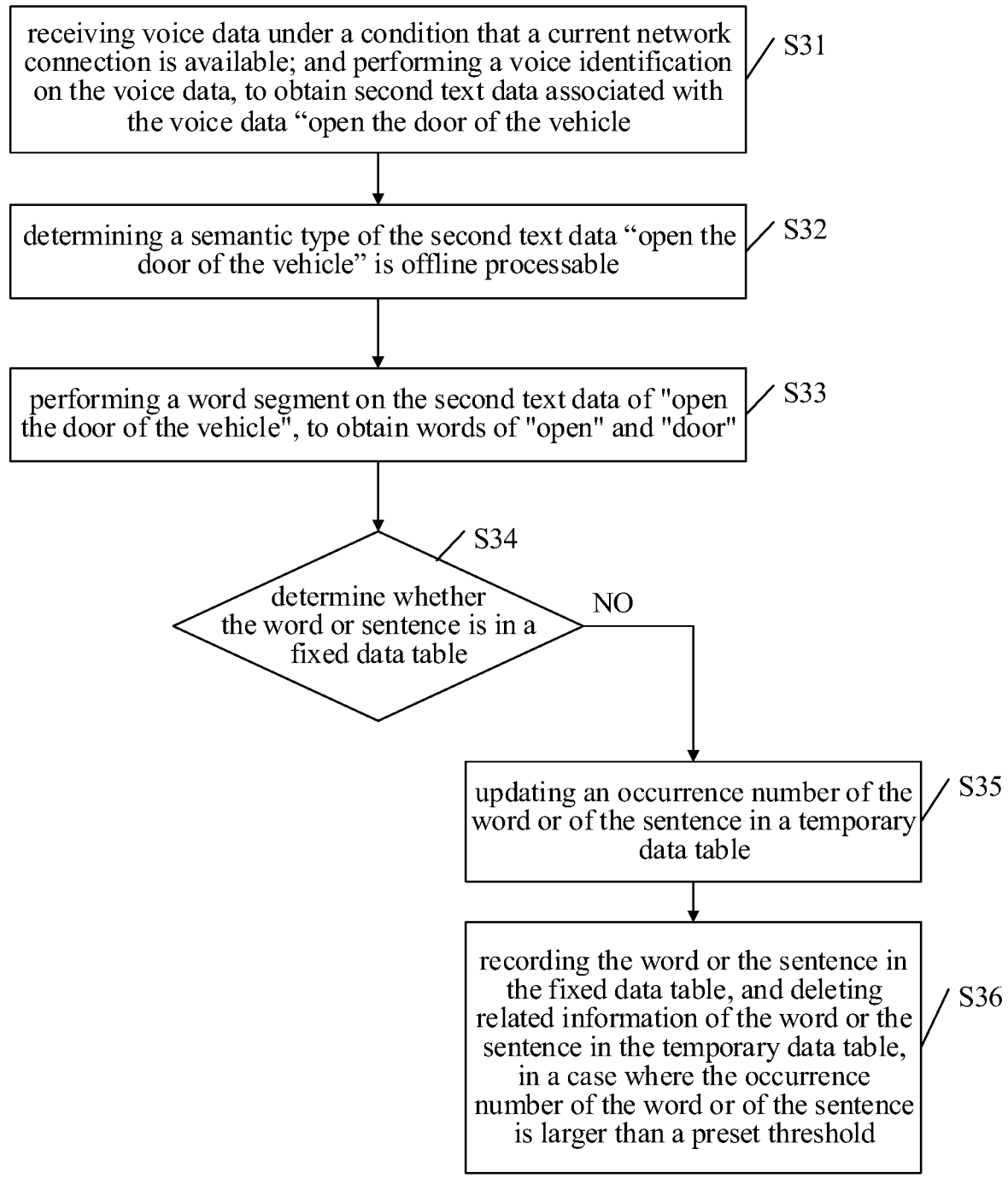
FIG. 3 is a flowchart showing an implementation of updating data in a temporary data table and in a fixed data table according to an embodiment of the present application.

FIG. 3 is a flowchart showing an implementation of updating data in a temporary data table and in a fixed data table according to an embodiment of the present application. As illustrated in FIG. 3, in the implementation, the method may include: receiving voice data under a condition that a current network connection is available; and performing a voice identification on the voice data, to obtain second text data associated with the voice data at S31. For example, the obtained second text data may be "open the door of the vehicle".

In the implementation, the method may further include determining a semantic type of the second text data is offline processable at S32. A semantic type of text data which is offline processable generally may be executed without network support, such as a semantic type of text data for controlling a vehicle. In contrast, a semantic type of text data which is not offline processable generally cannot be executed without network support, such as semantic types of text data for querying weather information, semantic types of text data for querying encyclopedic information. In this example, the semantic type of the second text data "open the door of the vehicle" may be determined as offline processable.

In the implementation, the method may further include performing a word segment on the second text data of "open the door of the vehicle", to obtain words of "open" and "door" at S33.

In the following, contents in a temporary data table and/or in a fixed data table may be updated according to the above words or sentences. For ease of understanding, a temporary data table and a fixed data table are introduced first.

In a possible implementation, an occurrence number of a word or a sentence in an online voice identification result (i.e., the "second text data" described above) may be recorded in a temporary data table. Data may be stored in a temporary data table in a following manner. See Table 1 below.

TABLE 1

| word or sentence | occurrence number |
|---|---|
| word 1 | |
| word 2 | |
| ... | |
| sentence 1 | |

When an occurrence number of a word or a sentence is larger than a first preset threshold, the word or the sentence may be recorded into a fixed data table, and the related data of the word or the sentence may be deleted from a temporary data table. In a case where a storage amount of the temporary data table reaches a storage upper limit, the previous data may be deleted in an LRU mode, thereby releasing the storage space of the temporary data table. For example, in a case where the storage amount of the temporary data table reaches a storage upper limit, usage counters of the data in each row of Table 1 may be determined. The smaller usage counter, the smaller the occurrence number of the word or the sentences recorded in table 1. Then, data with a small usage counter may be deleted from Table 1.

A fixed data table is used to record common text data, wherein the common text data is a voice identification result with an occurrence number larger than a first preset threshold. That is, the common text data in a fixed data table are words and sentences transferred from a temporary data table. Further, semantics parsing result of the common text data may also be stored in a fixed data table. Here, the semantics parsing result may refer to an operation instruction. For example, common text data may be "open the door of the vehicle", "open the door", or "unlock the door of the vehicle". Obviously, the contents of the three common text data are different, however, the semantics parsing results may be the same, that is, an operation instruction for opening the door of the vehicle. Data may be stored in a fixed data table in a following manner. See Table 2 below.

TABLE 2

| common text data | semantics parsing result |
|---|---|
| open the door of the vehicle | operation instruction of opening the door |
| open the door | operation instruction of opening the door |
| unlock the door of the vehicle | operation instruction of opening the door |
| roll down the window of the vehicle | |
| ... | |

The content recorded in Table 2 is relatively fixed and thus may be used to correct offline voice identification results.

Based on the above description of a temporary data table and a fixed data table, the subsequent steps of the voice identification method according to an embodiment of the present application are described below.

In a possible implementation, the method may further include determine whether the word or sentence obtained in S33 (that is, "open", "door" or "open the door") is in a fixed data table at S34. If the word or sentence is not in the fixed data table, the process may be proceeded to S35. If the word or sentence is in the fixed data table, it indicates that the word or the sentence are determined as common text data, and then the process may be ended.

In a possible implementation, the method may further include updating an occurrence number of the word or of the sentence in a temporary data table at S35. Specifically, if a record of the word or of the sentence is in the temporary data table, the occurrence number of word or of the sentence is incremented by 1. If no record of the word or of the sentence is in the temporary data table, the word or the sentence is recorded in the temporary data table, further, the occurrence number of the word or of the sentence is set to 1 in the temporary data table.

In a possible implementation, the method may further include recording the word or the sentence in the fixed data table, and deleting related information of the word or the sentence in the temporary data table, in a case where the occurrence number of the word or of the sentence is larger than a preset threshold at S36.

Figure 4:
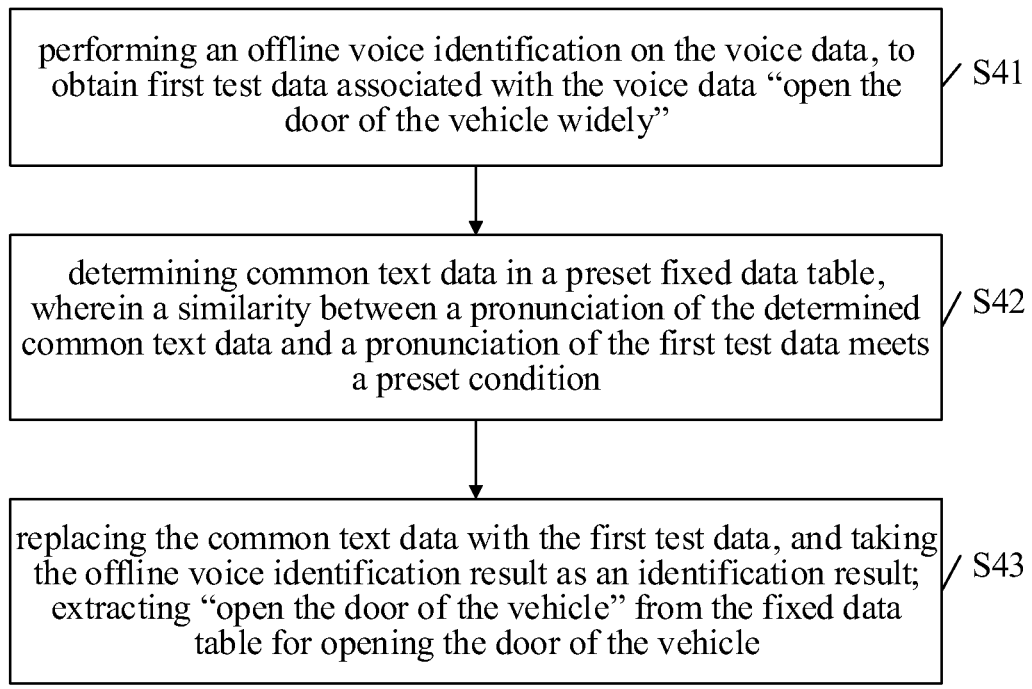
FIG. 4 is a flowchart showing an implementation of a voice identification in an in-vehicle voice interaction according to an embodiment of the present application.

The voice identification method according to an embodiment of the present application may be applied to an in-vehicle voice interaction apparatus. FIG. 4 a flowchart showing an implementation of a voice identification in an in-vehicle voice interaction according to an embodiment of the present application. As illustrated in FIG. 4, the implementation may include: receiving voice data under a condition that a network connection is unavailable; and performing an offline voice identification on the voice data, to obtain first text data associated with the voice data at S41. In the implementation, it is assumed that the voice data is "open the door of the vehicle (that is, 'da kai che men' in Chinese)". Due to the relatively low accuracy of an offline voice identification result, the voice data may be incorrected identified and the obtained corresponding first text data may be "open the door of the vehicle widely (that is, 'sa kai che men' in Chinese)".

In a possible example, the implementation may further include determining common text data in a preset fixed data table, wherein a similarity between a pronunciation of the determined common text data and a pronunciation of the first text data meets a preset condition at S42. Specifically, it is assumed that common text data "open the door of the vehicle" is in the fixed data table. The phonemes at the same position of the text data "open the door of the vehicle (that is, 'da kai che men' in Chinese)" and the text data "open the door of the vehicle widely (that is, 'sa kai che men' in Chinese)" are compared one by one to determine a same phoneme. Then, it is determined that a ratio of the number of same phonemes to the number of all phonemes is larger than a preset ratio threshold. Therefore, it may be determined that the similarity between a pronunciation of the common text data "open the door of the vehicle (that is, 'da kai che men' in Chinese)" and a pronunciation of the text data "open the door of the vehicle widely (that is, 'sa kai che men' in Chinese)" meets a preset condition, the process may be proceeded to S43. In a case where no common text data in a preset fixed data table is determined, wherein a similarity between a pronunciation of the determined common text data and a pronunciation of the first text data meets a preset condition, an ordinary offline parsing process may be performed.

A phoneme is the smallest unit in a voice. Based on a pronunciation action in a syllable, a phoneme refers to a pronunciation action. Phonemes may be categorized into two types: vowels and consonants. When comparing the voices of "open the door of the vehicle (that is, 'da kai che men' in Chinese)" and "open the door of the vehicle widely (that is, 'sa kai che men' in Chinese)", it may be determined that the first phonemes of the voices are different, and the remaining phonemes of the voices are the same.

Other determination rules may also be used, when determining common text data in a preset fixed data table, wherein a similarity between a pronunciation of the determined common text data and a pronunciation of the first text data meets a preset condition. For example, in a case where the pronunciation of two adjacent vowel phonemes or consonant phonemes of common text data and the pronunciation of two adjacent vowel phonemes or consonant phonemes of a first text data are different, it may be determined that the similarity between the pronunciation of the common text data and the pronunciation of the first text data does not meet a preset condition.

In a possible example, the implementation may further include replacing the first text data "open the door of the vehicle widely (that is, 'sa kai che men' in Chinese)" with the common text data "open the door of the vehicle (that is, 'da kai che men' in Chinese)", and determining the "open the door of the vehicle (that is, 'da kai che men' in Chinese)" as a final offline voice identification result at S43. Moreover, the semantics parsing result associated with the common text data "open the door of the vehicle (that is, 'da kai che men' in Chinese)" may be extracted from the fixed data table for opening the door of the vehicle.

Above embodiments are merely introduced as examples applied to an in-vehicle voice interaction apparatus. The method according to the embodiment of the present application is not limited to the above application scenarios. Specifically, in embodiment of the present application, a historical result of an offline voice identification may be used to determine common text data in a fixed data table, in order to correct a subsequent offline voice identification result. Alternatively, in an embodiment of the present application, a historical result of an online voice identification may also be used to determine common text data in a fixed data table, in order to correct a subsequent online voice identification result.

Figure 5:
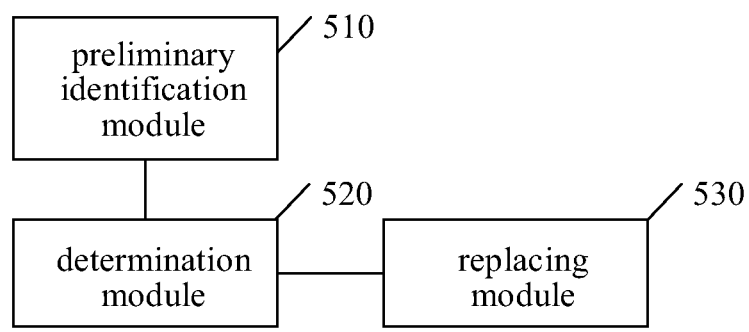
FIG. 5 is a schematic structural diagram showing a voice identification device according to an embodiment of the present application.

A voice identification apparatus is further provided according to an embodiment of the present application. FIG. 5 is a schematic structural diagram showing a voice identification apparatus according to an embodiment of the present application. As shown in FIG. 5, the device may include: a preliminary identification module 510 configured to receive voice data; and perform a voice identification on the voice data, to obtain first text data associated with the voice data; a determination module 520 configured to determine common text data in a preset fixed data table, wherein a similarity between a pronunciation of the determined common text data and a pronunciation of the first text data meets a preset condition, wherein the determined common text data is a voice identification result with an occurrence number larger than a first preset threshold; and a replacement module 530 configured to replace the first text data with the determined common text data, in response to a determination of the common text data in the preset fixed data table.

In a possible implementation, the preliminary identification module 510 is configured to perform an offline voice identification on the voice data.

Figure 6:
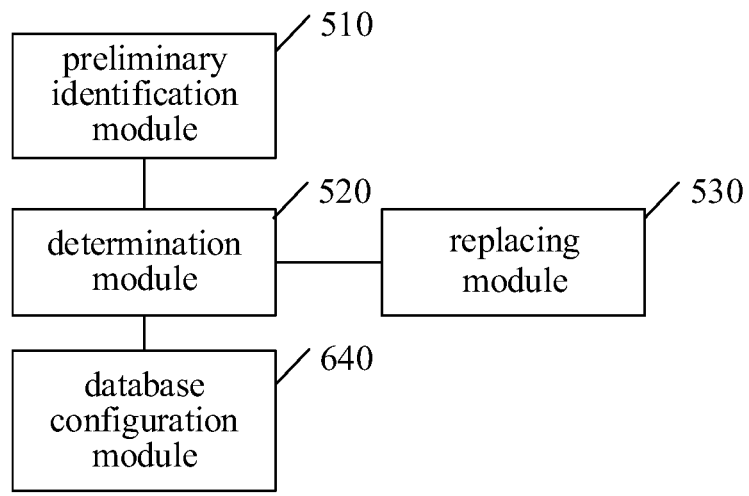
FIG. 6 is a schematic structural diagram showing a voice identification device according to another embodiment of the present application.

In a possible implementation, another voice identification device is provided according to an embodiment of the present application. FIG. 6 is a schematic structural diagram showing a voice identification device according to another embodiment of the present application. As illustrated in FIG. 6, the device may include a preliminary identification module 510, a determination module 520, a replacement module 530, and a database configuration module 640.

The preliminary identification module 510, the determination module 520, and the replacement module 530 have the same functions as the corresponding modules in the foregoing embodiment.

The database configuration module 640 is configured to set the fixed data table, where the fixed data table includes one or more common text data, and the common text data is obtained by an online voice identification and has the occurrence number larger than the first preset threshold.

In a possible implementation, the database configuration module 640 is configured to perform an online voice identification on a pre-obtained voice data, to obtain second text data associated with the pre-obtained voice data, determine a semantic type of the second text data is offline processable; perform a word segment on the second text data, to obtain at least one word; and determine whether the obtained at least one word or the second text data is in a fixed data table; update an occurrence number of the at least one word or of the second text data in a temporary data table, in a case where the obtained at least one word or the second text data is not comprised in the fixed datable; and record a word or second text data having an occurrence number larger than a second preset threshold into the fixed data table, as a candidate common text data in the fixed data table.

In a possible implementation, the database configuration module 640 is further configured to release a storage space of the temporary data table in a Least Recently Used mode, in a case that a storage amount of the temporary data table reaches a storage upper limit.

In a possible implementation, semantics parsing result of the common text data is stored in the preset fixed data table; and the replacement module 530 is further configured to extract the parsed semantics of the at common text data from the preset fixed data table, in response to a determination of the common text data in the preset fixed data table.

In a possible implementation, the determination module 520 is configured to: compare the first text data with each candidate common text data in the preset fixed data table, by comparing phonemes at the same position of the first text data and the candidate common text data one by one to determine a same phoneme; and determine that the similarity between a pronunciation of the determined common text data and a pronunciation of the first text data meets the preset condition, in a case that a ratio of the number of same phonemes to the number of all phonemes is larger than a preset ratio threshold.

In this embodiment, functions of modules in the apparatus refer to the corresponding description of the method mentioned above and thus a detailed description thereof is omitted herein.

Figure 7:
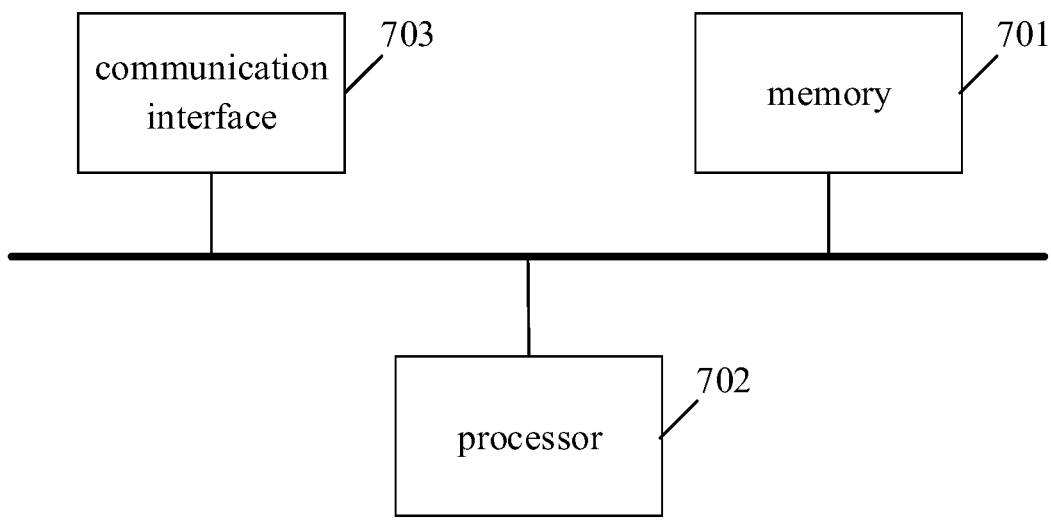
FIG. 7 is a schematic structural diagram of a voice identification apparatus according to an embodiment of the present application.

A voice identification apparatus is provided according to another embodiment of the present application. FIG. 7 is a schematic structural diagram of a voice identification apparatus according to an embodiment of the present application. As illustrated in FIG. 7, the apparatus includes a memory 701 and a processor 702, wherein a computer program that can run on the processor 702 is stored in the memory 701. The processor 702 executes the computer program to implement the voice identification method according to the foregoing embodiments. The number of either the memory 701 or the processor 702 may be one or more.

The apparatus may further include a communication interface 703 configured to communicate with an external device and exchange data.

The memory 701 may include a high-speed RAM memory and may also include a non-volatile memory, such as at least one magnetic disk memory.

If the memory 701, the processor 702, and the communication interface 703 are implemented independently, the memory 701, the processor 702, and the communication interface 703 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 7 to represent the bus, but it does not mean that there is only one bus or one type of bus.

Optionally, in a specific implementation, if the memory 701, the processor 702, and the communication interface 703 are integrated on one chip, the memory 701, the processor 702, and the communication interface 703 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

In summary, a voice identification method and apparatus are provided. After a voice identification on the voice data is performed and first text data associated with the voice data is obtained, the first text data is replaced with a determined common text data, in a case where common text data in a preset fixed data table is determined, wherein a similarity between a pronunciation of the determined common text data and a pronunciation of the first text data meets a preset condition. In this way, a correction of a voice identification result may be realized, thereby improving voice identification accuracy. The voice identification method provided in an embodiment of the present application may be to correct an offline voice identification result, and common text data in a fixed data table may be obtained according to the offline voice identification result. Specifically, the determined common text data may be a voice identification result with an occurrence number larger than a first preset threshold.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A voice identification method, comprising:
   receiving voice data; and performing a voice identification on the voice data, to obtain first text data associated with the voice data;
   determining common text data in a preset fixed data table, wherein a similarity between a pronunciation of the determined common text data and a pronunciation of the first text data meets a preset condition, wherein a voice identification result with an occurrence number larger than a first preset threshold is pre-recorded into the fixed data table, as the common text data; and
   replacing the first text data with the determined common text data.

2. The voice identification method according to claim 1, wherein the performing a voice identification on the voice data comprises: performing an offline voice identification on the voice data, wherein
   the common text data is obtained by an online voice identification and has the occurrence number larger than the first preset threshold.

3. The voice identification method according to claim 1, further comprising: establishing the preset fixed data table by:
   performing an online voice identification on a pre-obtained voice data, to obtain second text data associated with the pre-obtained voice data;
   determining a semantic type of the second text data is offline processable;
   performing a word segment on the second text data, to obtain at least one word; and
   determine whether the obtained at least one word or the second text data is in a fixed data table; updating an occurrence number of the at least one word or of the second text data in a temporary data table, in a case where the obtained at least one word or the second text data is not comprised in the fixed datable; and recording a word or second text data having an occurrence number larger than a second preset threshold into the fixed data table, as a candidate common text data in the fixed data table.

4. The voice identification method of claim 3, further comprising:
   releasing a storage space of the temporary data table in a Least Recently Used mode, in a case where a storage amount of the temporary data table reaches a storage upper limit.

5. The voice identification method according to claim 1, wherein semantics parsing result of the common text data is stored in the preset fixed data table; and
   after the determining common text data in a preset fixed data table, the method further comprises extracting the parsed semantics of the at common text data from the preset fixed data table.

6. The voice identification method according to claim 1, wherein the determining common text data in a preset fixed data table comprises:
  comparing the first text data with each candidate common text data in the preset fixed data table, by comparing phonemes at the same position of the first text data and the candidate common text data one by one to determine a same phoneme; and
  determining that the similarity between a pronunciation of the determined common text data and a pronunciation of the first text data meets the preset condition, in a case where a ratio of the number of same phonemes to the number of all phonemes is larger than a preset ratio threshold.

7. A voice identification device, comprising:
one or more processors; and
a memory for storing one or more programs, wherein the one or more programs are executed by the one or more processors to enable the one or more processors to:
  receive voice data; and perform a voice identification on the voice data, to obtain first text data associated with the voice data;
  determine common text data in a preset fixed data table, wherein a similarity between a pronunciation of the determined common text data and a pronunciation of the first text data meets a preset condition, wherein a voice identification result with an occurrence number larger than a first preset threshold is pre-recorded into the fixed data table, as the common text data; and
  replace the first text data with the determined common text data, in response to a determination of the common text data in the preset fixed data table.

8. The voice identification device according to claim 7, wherein the one or more programs are executed by the one or more processors to enable the one or more processors to perform an offline voice identification on the voice data; and
  set the fixed data table, wherein the fixed data table comprises one or more common text data, and the common text data is obtained by an online voice identification and has the occurrence number larger than the first preset threshold.

9. The voice identification device according to claim 8, wherein the one or more programs are executed by the one or more processors to enable the one or more processors to:
  perform an online voice identification on a pre-obtained voice data, to obtain second text data associated with the pre-obtained voice data;
  determine a semantic type of the second text data is offline processable;
  perform a word segment on the second text data, to obtain at least one word; and
  determine whether the obtained at least one word or the second text data is in a fixed data table; update an occurrence number of the at least one word or of the second text data in a temporary data table, in a case where the obtained at least one word or the second text data is not comprised in the fixed datable; and record a word or second text data having an occurrence number larger than a second preset threshold into the fixed data table, as a candidate common text data in the fixed data table.

10. The voice identification device of claim 9, wherein the one or more programs are executed by the one or more processors to enable the one or more processors to:
  release a storage space of the temporary data table in a Least Recently Used mode, in a case where a storage amount of the temporary data table reaches a storage upper limit.

11. The voice identification device according to claim 7, wherein semantics parsing result of the common text data is stored in the preset fixed data table; and
  the one or more programs are executed by the one or more processors to enable the one or more processors to extract the parsed semantics of the at common text data from the preset fixed data table, in response to a determination of the common text data in the preset fixed data table.

12. The voice identification device according to claim 7, wherein the one or more programs are executed by the one or more processors to enable the one or more processors to:
  compare the first text data with each candidate common text data in the preset fixed data table, by comparing phonemes at the same position of the first text data and the candidate common text data one by one to determine a same phoneme; and
  determine that the similarity between a pronunciation of the determined common text data and a pronunciation of the first text data meets the preset condition, in a case where a ratio of the number of same phonemes to the number of all phonemes is larger than a preset ratio threshold.

13. A non-transitory computer-readable storage medium, in which a computer program is stored, wherein the computer program, when executed by a processor, causes the processor to implement the method of claim 1.

* * * * *